(12) United States Patent
Leske

(10) Patent No.: US 9,876,831 B1
(45) Date of Patent: Jan. 23, 2018

(54) FACILITATING COMMUNICATION BETWEEN USERS

(71) Applicant: Google Inc., Mountain View, CA (US)

(72) Inventor: Matthew John Leske, Stockholm (SE)

(73) Assignee: Google LLC, Mountain View, CA (US)

( * ) Notice: Subject to any disclaimer, the term of this patent is extended or adjusted under 35 U.S.C. 154(b) by 197 days.

(21) Appl. No.: 14/298,321

(22) Filed: Jun. 6, 2014

(51) Int. Cl.
*G06F 15/16* (2006.01)
*H04L 29/06* (2006.01)
*H04L 12/58* (2006.01)

(52) U.S. Cl.
CPC .............. *H04L 65/60* (2013.01); *H04L 51/32* (2013.01)

(58) Field of Classification Search
USPC ........ 709/206, 227, 219, 203; 715/716, 781; 370/261
See application file for complete search history.

(56) References Cited

U.S. PATENT DOCUMENTS

| | | | | |
|---|---|---|---|---|
| 6,057,503 | A * | 5/2000 | Shinsky | G10H 1/0025 84/613 |
| 6,156,965 | A * | 12/2000 | Shinsky | G10H 1/0025 84/650 |
| 6,694,352 | B1 | 2/2004 | Omoigui | |
| 7,996,566 | B1 | 8/2011 | Sylvain et al. | |
| 8,112,490 | B2 | 2/2012 | Upton et al. | |
| 8,554,840 | B1 | 10/2013 | Milgramm | |
| 2006/0002315 | A1* | 1/2006 | Theurer | G06F 3/0481 370/261 |
| 2006/0031779 | A1* | 2/2006 | Theurer | G06F 3/1454 715/781 |
| 2008/0059580 | A1 | 3/2008 | Kalinowski et al. | |
| 2010/0164956 | A1* | 7/2010 | Hyndman | G06F 3/011 345/427 |
| 2011/0029892 | A1 | 2/2011 | Kurtz et al. | |
| 2011/0093784 | A1* | 4/2011 | Kiraz | G06F 17/30864 715/719 |
| 2011/0107379 | A1* | 5/2011 | Lajoie | H04L 65/4076 725/87 |
| 2012/0066355 | A1 | 3/2012 | Tiwari | |
| 2012/0274725 | A1 | 11/2012 | Robertson | |
| 2012/0303481 | A1* | 11/2012 | LouisN'jai | G06F 3/0481 705/26.8 |
| 2012/0303834 | A1* | 11/2012 | Adam | H04L 65/4084 709/231 |
| 2013/0162750 | A1 | 6/2013 | Nerst et al. | |

(Continued)

FOREIGN PATENT DOCUMENTS

WO 2014041547 A1 3/2014

OTHER PUBLICATIONS

Livestream LLC, Livestream, www.itunes.apple.com, Apr. 6, 2014.
(Continued)

*Primary Examiner* — Tammy Nguyen
(74) *Attorney, Agent, or Firm* — IP Spring

(57) ABSTRACT

Implementations generally relate to facilitating communication between users. In some implementations, a method includes enabling a first user to initiate a chat session with one or more second users, wherein the chat session is a text chat session. The method further includes enabling the first user to broadcast a live video stream to the one or more second users during the chat session. The method further includes enabling at least the first user to convert the chat session to a video session.

20 Claims, 5 Drawing Sheets

(56) References Cited

U.S. PATENT DOCUMENTS

| | | | | |
|---|---|---|---|---|
| 2013/0179275 A1* | 7/2013 | Harb | ............... | G06Q 30/0241 705/14.73 |
| 2013/0212222 A1* | 8/2013 | Outlaw | ............... | H04L 65/4092 709/219 |
| 2013/0227149 A1* | 8/2013 | Athlur | ............... | H04L 67/14 709/227 |
| 2013/0304820 A1* | 11/2013 | Vasquez | ............... | H04L 67/00 709/204 |
| 2013/0305158 A1* | 11/2013 | Vasquez | ............... | G06F 3/0481 715/733 |
| 2013/0346885 A1* | 12/2013 | Singh | ............... | H04L 51/04 715/758 |
| 2014/0046775 A1* | 2/2014 | Harb | ............... | G06Q 30/0269 705/14.66 |
| 2014/0136990 A1* | 5/2014 | Gonnen | ............... | H04L 51/18 715/752 |
| 2014/0280490 A1* | 9/2014 | Artun | ............... | H04L 65/602 709/203 |
| 2015/0039468 A1* | 2/2015 | Spitz | ............... | G06Q 30/0613 705/26.41 |
| 2015/0119142 A1* | 4/2015 | Abbott | ............... | G02B 27/01 463/31 |
| 2015/0193516 A1* | 7/2015 | Harb | ............... | G06Q 30/02 707/625 |
| 2015/0288927 A1* | 10/2015 | Haginas | ............... | H04N 7/147 348/14.03 |
| 2015/0296242 A1* | 10/2015 | Khalil | ............... | H04N 21/4781 725/25 |
| 2015/0378520 A1* | 12/2015 | Chandrasekaran | ... | G06F 3/0482 715/716 |
| 2016/0140244 A1* | 5/2016 | Gerding | ............... | G06F 17/30867 707/769 |

OTHER PUBLICATIONS

Ustream, play.google.com/store/apps/details?id=tv.ustream. ustream, Mar. 14, 2014.

Lunden, "YouTube Opens Up Live Streaming and Google+ Hangouts on Air to All Verified Accounts", http://techcrunch.com/, Dec. 12, 2013.

download.com, "Streaming Video Recorder", http://download.cnet.com/Streaming-Video-Recorder/3000-12512_4-75586860.html, Jun. 6, 2014.

* cited by examiner

400

500

FACILITATING COMMUNICATION BETWEEN USERS

BACKGROUND

Live video streaming is often used to enable individuals to share video content with others in real-time across geographically dispersed locations. The sender of a live video stream typically provides an invitation to recipients and a link to the live video stream. After accepting the invitation, a recipient can view the live video stream typically at a scheduled time.

SUMMARY

Implementations generally relate to facilitating communication between users. In some implementations, a method includes enabling a first user to initiate a chat session with one or more second users, where the chat session is a text chat session. The method further includes enabling the first user to broadcast a live video stream to the one or more second users during the chat session. The method further includes enabling at least the first user to convert the chat session to a video session.

With further regard to the method, in some implementations, the initiated chat session is selected by the first user, and where the initiated chat session is selected from a plurality of chat sessions. In some implementations, the first user broadcasts the live video stream in a social network system. In some implementations, the method further includes providing a viewing notification to the one or more second users, where the viewing notification indicates that one or more of the second users can view the live video stream. In some implementations, the method further includes enabling the one or more second users to view the live video stream in real-time. In some implementations, the method further includes enabling at least the first user to convert the chat session to a video session. In some implementations, the method further includes enabling at least the first user to convert the chat session to a video session, where the chat session continues during the video session. In some implementations, the method further includes generating a copy of the live video stream; and sending at least one recorded portion of the live video stream to the one or more second users. In some implementations, the method further includes generating a copy of the live video stream for future viewing. In some implementations, the method further includes generating a copy of the live video stream; sending at least one recorded portion of the live video stream to the one or more second users; and enabling the one or more second users to view the at least one recorded portion at a later time.

In some implementations, a method includes enabling a first user to initiate a chat session with one or more second users, where the chat session is a text chat session, where the initiated chat session is selected by the first user, where the initiated chat session is selected from a plurality of chat sessions. The method further includes enabling the first user to broadcast a live video stream to the one or more second users during the chat session, where the first user broadcasts the live video stream in a social network system. The method further includes enabling at least the first user to convert the chat session to a video session.

In some implementations, a system includes one or more processors, and logic encoded in one or more tangible media for execution by the one or more processors. When executed, the logic is operable to perform operations including: enabling a first user to initiate a chat session with one or more second users, where the chat session is a text chat session; and enabling the first user to broadcast a live video stream to the one or more second users during the chat session.

With further regard to the system, in some implementations, the initiated chat session is selected by the first user, and where the initiated chat session is selected from a plurality of chat sessions. In some implementations, the first user broadcasts the live video stream in a social network system. In some implementations, the logic when executed is further operable to perform operations including providing a viewing notification to the one or more second users, where the viewing notification indicates that one or more of the second users can view the live video stream. In some implementations, the logic when executed is further operable to perform operations including enabling the one or more second users to view the live video stream in real-time. In some implementations, the logic when executed is further operable to perform operations including enabling at least the first user to convert the chat session to a video session. In some implementations, the logic when executed is further operable to perform operations including enabling at least the first user to convert the chat session to a video session, where the chat session continues during the video session. In some implementations, the logic when executed is further operable to perform operations including: generating a copy of the live video stream; and sending at least one recorded portion of the live video stream to the one or more second users. In some implementations, the logic when executed is further operable to perform operations including generating a copy of the live video stream for future viewing.

DETAILED DESCRIPTION

Implementations described herein facilitate communication between users. In various implementations, a system enables a first user to initiate a chat session with one or more other users, where the chat session is a text chat session. In some implementations, the initiated chat session is selected from existing chat sessions that have been paused or ended.

The system then enables the first user to broadcast a live video stream to the one or more other users during the initiated chat session. In various implementations, the first user broadcasts the live video stream to the other users in a social network system. In some implementations, the system enables the one or more other users to view the live video stream in real-time. In some implementations, the system further generates a copy of the live video stream, and sends at least one recorded portion of the live video stream to the one or more other users to view at a later time. In some implementations, the system enables the first user to convert the chat session to a video session.

Figure 1:
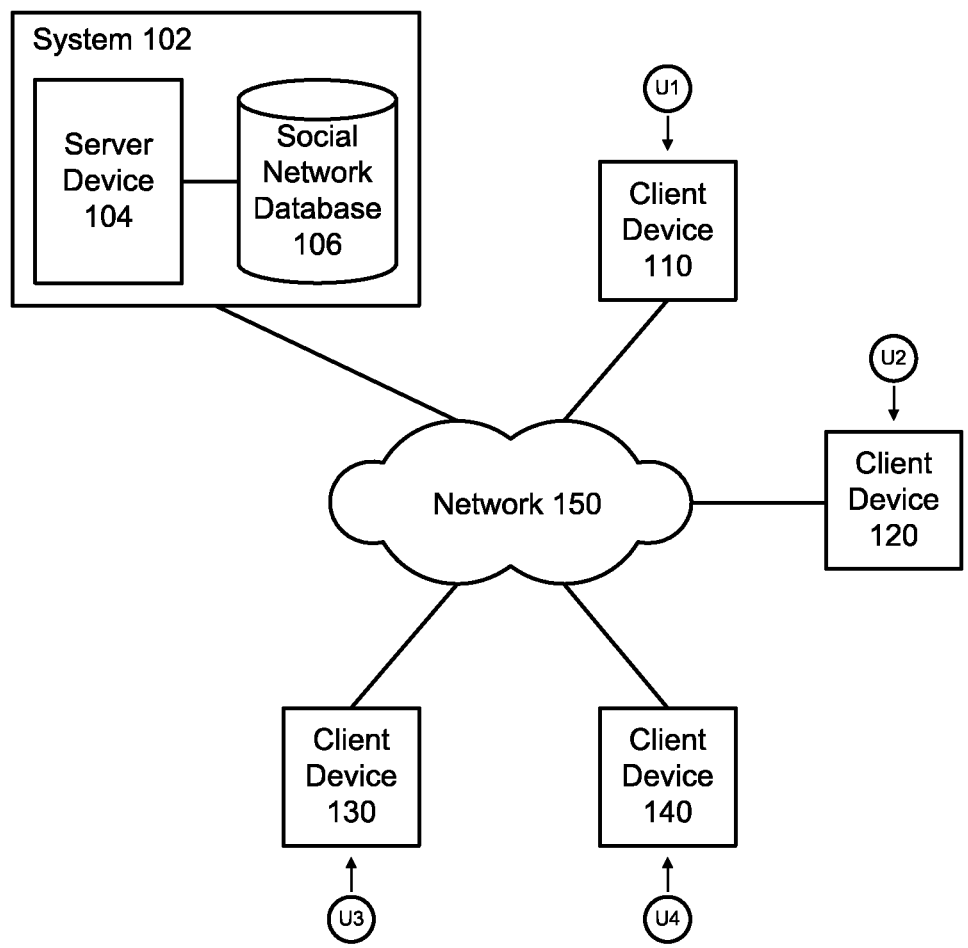
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other using various communication modes, where respective client devices 110, 120, 130, and 140 transmit media streams to each other.

In the various implementations described herein, the processor of system 102 causes the elements described herein (e.g., text messages, live video streams, conferencing videos, etc.) to be displayed in a user interface on one or more display screens.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
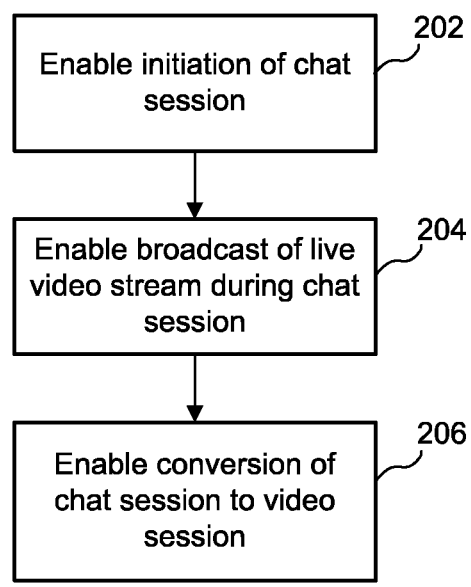
FIG. 2 illustrates an example simplified flow diagram for facilitating communication between users, according to some implementations.

FIG. 2 illustrates an example simplified flow diagram for sharing live video streams, according to some implementations. Referring to both FIGS. 1 and 2, a method is initiated in block 202, where system 102 enables a first user to initiate a chat session with one or more second users. In various implementations, the chat session is a text chat session. In some implementations, system 102 enables the first user to initiate a new chat session. For example, system 102 may enable the first user to create a new chat session that has not previously existed.

Note that for ease of illustration, the "first user" refers to the user who initiates the chat session, and a "second user" refers to a user who subsequently accepts/joins the chat session. There may be one or more second users who join the chat session.

In some implementations, system 102 enables the first user to initiate an existing chat session. For example, system 102 may enable the first user to resume an existing chat session that has previously been paused or ended. As such, in some implementations, the initiated chat session is selected by the first user, where the initiated chat session is selected from a set of existing chat sessions. An existing chat session may be referred to as persistent chat session in that the chat session can be ongoing with one or more stops and starts. As indicated above, the chat session can end or pause, and then resume at a later time. In various implementations, when a given chat session ends, system 102 maintains and stores a list of the participants for future chat sessions. System 102 may store the list of participants in any suitable storage location. As described in more detail below, system 102 may use the list of participants as an invite list for future chat sessions.

In various implementations, system 102 enables the first user to initiate the chat session with one or more other users. If the first user is initiating a chat session that is a persistent chat session (e.g., preexisting chat session being resumed), system 102 accesses the stored participant list and uses that participant list as an invite list for the resumed chat session.

In block 204, system 102 enables the first user to broadcast a live video stream to the one or more second users during the chat session. For example, if the first user is at an event (e.g., party, concert, wedding, etc.), or at any given location (e.g., home, beach, park, etc.), system 102 enables the first user to use the camera on the first user's device (e.g., phone, tablet, etc.) to video record the scene and to live stream the video in real-time to the other participants in the chat session. System 102 may provide a live video stream share button in the chat session user interface, where the first user can select the live video stream share button to initiate the sharing of the live video stream to the other chat session participants. In various implementations, system 102 enables the first user to broadcast the live video stream in a social network system.

Figure 3:
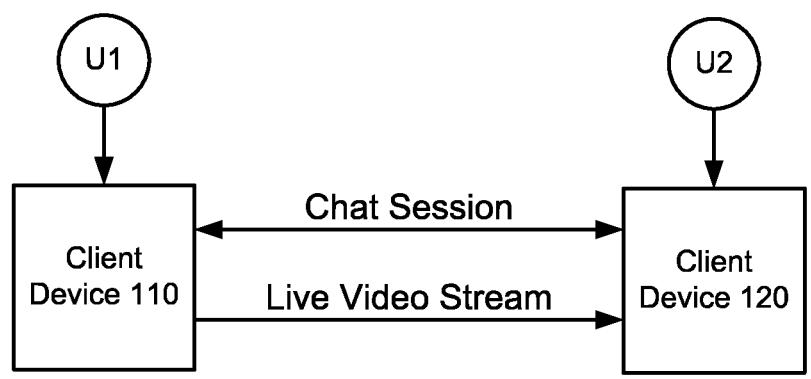
FIG. 3 illustrates an example simplified diagram showing a communication flow between users, according to some implementations.

FIG. 3 illustrates an example simplified diagram showing a communication flow 300 between users, according to some implementations. As shown, the first user (e.g., user U1) has initiated a chat session with a second user (e.g., user U2), where the first and second users are communicating via their respective devices 110 and 120. As shown, the first user is also sharing a live video stream with the second user. For ease of illustration, two users are shown. These implementations and others may apply to any number of users. The actual number of users will depend on the particular scenario.

Also, for ease of illustration, the first user is described as broadcasting a live video stream. In various implementations, system 102 enables any participant in the chat session to broadcast his or her own video stream to the other participants.

In various implementations, system 102 enables the first user to broadcast the live video stream to the one or more second users within the chat session. For example, in various implementations, the chat session between the first user and second users continues uninterrupted while the first user initiates the broadcast of the live video stream and as the first user continues to broadcast the live video stream. In some implementations, system 102 causes the chat session to be displayed in one portion of the user interface and causes the live video stream to be displayed in another portion of the user interface. As such, the chat session and live video stream occur simultaneously in the same user interface.

The live video stream is different from a video conference in that a live video stream is a one-way video stream (e.g., from sender to recipient(s)). In contrast, a video conference is bi-directional (e.g., sender to receiver and vice versa). In some implementations, with live video streams, the live video stream can potential be broadcast to hundreds of recipients.

The live video stream is also different from a video conference in that the live video stream may be asynchronous with other sessions. With a conference call, the video(s) need to be synchronous with a voice session.

In some implementations, system 102 provides a viewing notification to the one or more second users, where the viewing notification indicates that one or more of the second users can view the live video stream.

In various implementations, system 102 enables the one or more second users to view the live video stream in real-time. For example, suppose the first user is sending a text message to the second users in a chat session, and the text message describes an event (e.g., a wedding) that the first user is attending. The first user can broadcast a live video stream of the event to the second users who can view the live video stream in real-time in the chat session. In some implementations, system 102 also causes the outgoing live video stream to be displayed on the sender's device. This enables the sender to see the live video stream that the sender is broadcasting.

Referring again to FIG. 2, in block 206, system 102 enables at least the first user to convert the chat session to a video session. In some implementations, when the first user initiates the conversion from the chat session to a video session, system 102 converts the one-way channel used for the live video stream into a two-way channel used for video conferencing.

Figure 4:
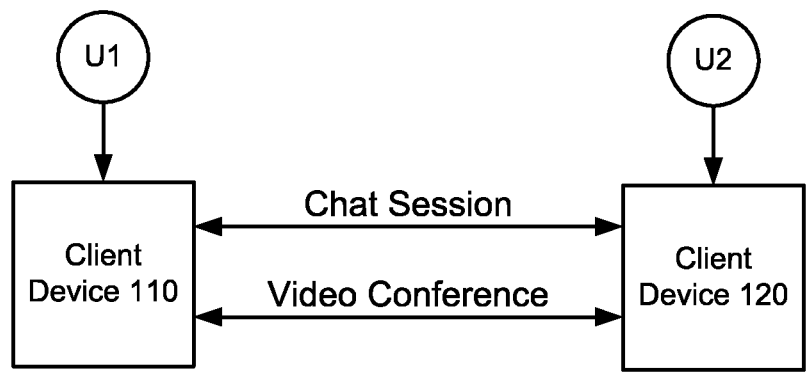
FIG. 4 illustrates an example simplified diagram showing a communication flow between users, according to some implementations.

FIG. 4 illustrates an example simplified diagram showing a communication flow 400 between users, according to some implementations. As shown, the first user (e.g., user U1) has initiated a chat session with a second user (e.g., user U2), where the first and second users are communicating via their respective devices 110 and 120. As shown, the first user has also converted the chat session to a video session/video conference. For ease of illustration, two users are shown. These implementations and others may apply to any number of users. The actual number of users will depend on the particular scenario.

In various implementations, system 102 enables the first user and the one or more second users to automatically join the video session when the chat session is converted to the video session. The video session may be considered an extension of the chat session, in that the participant list remains the same and the chat session continues but with a new mode of communication (e.g., video session).

In various implementations, for a given user interface, system 102 replaces the live video stream being displayed in a window with video conference videos in the same window. Note that the phrase video session may be used interchangeably with the phrase video conference session and the phrase video conference.

In some implementations, when the first user initiates the conversion from the chat session to a video session, system 102 adds a two-way channel used for video conferencing. In various implementations, for a given user interface, system 102 adds a window for video conferencing to the window for the live video stream.

In some implementations, system 102 enables the chat session to continue uninterrupted during the video session. As such, even though the chat session is described as being converted to a video session, in various implementations, the chat session is expanded to both a chat session and a video session. In some implementations, system 102 enables the live video stream to continue uninterrupted during video session.

In some implementations, system 102 generates a copy of each live video stream. In some implementations, system 102 stores the copy in the cloud. In some implementations, system 102 sends at least one recorded portion of the live video stream to the one or more second users. This enables the one or more second users to view the at least one recorded portion at a later time.

In some implementations, for each second user who begins viewing the live video stream, system 102 determines the point in the live video stream where each second user started viewing the live video stream. As such, system 102 may send to a particular second user the recorded portion of the live video stream that the particular second user has not seen. For example, if the particular second user missed the first 5 minutes of a given live video stream, system 102 may send the first 5 minutes of that live video stream to that particular second user. System 102 may send different recorded portions of the live video stream to different second users depending on what specific portions each missed. In some implementations, system 102 may also make the entire recorded video stream available any given second user for future viewing.

Implementations described herein provide various benefits. For example, implementations provide users with various modes of communication while remaining in the same session (e.g., same chat session). Implementations described herein also increase overall engagement among users in a social networking environment.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Figure 5:
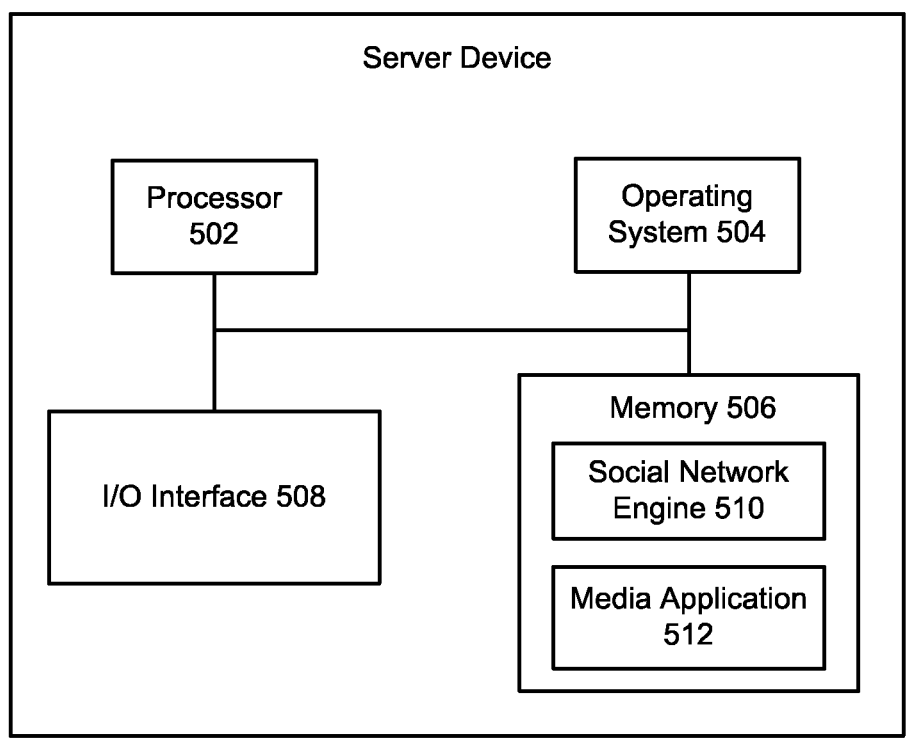
FIG. 5 illustrates a block diagram of an example server device, which may be used to implement the implementations described herein.

FIG. 5 illustrates a block diagram of an example server device 500, which may be used to implement the implementations described herein. For example, server device 500 may be used to implement server device 104 of FIG. 1, as well as to perform the method implementations described herein. In some implementations, server device 500 includes a processor 502, an operating system 504, a memory 506, and an input/output (I/O) interface 508. Server device 500 also includes a social network engine 510 and a media application 512, which may be stored in memory 506 or on any other suitable storage location or computer-readable medium. Media application 512 provides instructions that enable processor 502 to perform the functions described herein and other functions.

For ease of illustration, FIG. 5 shows one block for each of processor 502, operating system 504, memory 506, I/O interface 508, social network engine 510, and media application 512. These blocks 502, 504, 506, 508, 510, and 512 may represent multiple processors, operating systems, memories, I/O interfaces, social network engines, and media applications. In other implementations, server device 500 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A method comprising:
   receiving from a first user device, a selection of a text chat session from a collection of a plurality of previously paused or ended chat sessions;
   enabling the first user device to reinitiate the text chat session with one or more second users, wherein the reinitiated text chat session is provided on a user interface of the first user device, the user interface including a video share element;
   enabling the first user device to broadcast a live video stream to the one or more second users during the reinitiated text chat session in response to activation of the video share element on the user interface of the first user device, wherein the first user device broadcasts the live video stream in a social network system; and
   enabling at least the first user device to convert the reinitiated text chat session to a video session by enabling a one-way channel used for the live video stream to convert to a two-way channel for the video session, wherein the video session is provided in a same portion of the user interface as the live video stream was provided.

2. A method comprising:
   receiving from a first user device, a selection of a text chat session from a collection of plurality of previously paused or ended chat sessions;
   enabling the first user device to reinitiate the text chat session with one or more second users, wherein the reinitiated text chat session is provided on a user interface of the first user device, the user interface including a video share element;
   enabling the first user device to broadcast a live video stream to the one or more second users during the reinitiated text chat session in response to activation of the video share element on the user interface of the first user device;
   generating a copy of the live video stream;
   identifying a portion of the copy of the live video stream previously unseen by at least one user of the one or more second users during the broadcast, wherein the portion is less than the copy of the live video stream; and
   sending the portion to the at least one user of the one or more second users.

3. The method of claim 2, wherein the first user device broadcasts the live video stream in a social network system.

4. The method of claim 2, further comprising providing a viewing notification to the one or more second users, wherein the viewing notification indicates that one or more of the second users can view the live video stream.

5. The method of claim 2, further comprising enabling the one or more second users to view the live video stream in real-time.

6. The method of claim 2, further comprising enabling at least the first user device to convert the text chat session to a video session.

7. The method of claim 2, further comprising enabling at least the first user device to convert the text chat session to a video session, wherein the text chat session continues during the video session.

8. The method of claim 2, further comprising:
   generating a copy of the live video stream;
   sending at least one recorded portion of the live video stream to the one or more second users; and
   enabling the one or more second users to view the at least one recorded portion at a later time.

9. The method of claim 2, wherein sending of the portion includes sending a first segment of the portion to one of the at least one user of the one or more second users and sending a second segment of the portion to another of the at least one user of the one or more second users, wherein the first segment and the second segment include different segments of the live video stream.

10. The method of claim 2, wherein the one or more second users are selected from a stored participant list of participants in one or more previous text chat sessions.

11. The method of claim 2, wherein identifying the portion includes determining a point in the live video stream where the at least one user of the one or more second users started viewing the live video stream and determining the portion as prior to the point in the live video stream.

12. The method of claim 1, wherein the one or more second users are selected from a stored participant list of participants in one or more previous text chat sessions.

13. A system comprising:
   one or more processors; and
   logic encoded in one or more tangible media for execution by the one or more processors and when executed operable to perform operations comprising:

receiving from a first user device, a selection of a text chat session from a collection of a plurality of previously paused or ended chat sessions;

enabling a first user to reinitiate the text chat session with one or more second users, wherein the reinitiated text chat session is provided on a user interface of the first user device, the user interface including a video share element;

enabling the first user to broadcast a live video stream to the one or more second users during the reinitiated text chat session in response to activation of the video share element on the user interface of the first user device;

generating a copy of the live video stream;

identifying a portion of the copy of the live video stream previously unseen by at least one user of the one or more second users during the broadcast, wherein the portion is less than the copy of the live video stream; and sending the portion to the at least one user of the one or more second users.

14. The system of claim 13, wherein the first user device broadcasts the live video stream in a social network system.

15. The system of claim 13, wherein the logic when executed is further operable to perform operations comprising providing a viewing notification to the one or more second users, wherein the viewing notification indicates that one or more of the second users can view the live video stream.

16. The system of claim 13, wherein the logic when executed is further operable to perform operations comprising enabling the one or more second users to view the live video stream in real-time.

17. The system of claim 13, wherein the logic when executed is further operable to perform operations comprising enabling at least the first user device to convert the text chat session to a video session.

18. The system of claim 13, wherein the logic when executed is further operable to perform operations comprising enabling at least the first user device to convert the text chat session to a video session, wherein the text chat session continues during the video session.

19. The system of claim 13, wherein sending of the portion of the live video stream includes sending a first segment of the portion to one of the at least one user of the one or more second users and sending a second segment of the portion to another of the at least one user of the one or more second users, wherein the first segment and the second segment include different segments of the live video stream.

20. The system of claim 13, wherein identifying the portion includes determining a point in the live video stream where the at least one user of the one or more second users started viewing the live video stream and determining the portion as prior to the point in the live video stream.

* * * * *